(12) United States Patent
Zhu et al.

(10) Patent No.: US 12,425,490 B2
(45) Date of Patent: Sep. 23, 2025

(54) NETWORK STRUCTURE AND METHOD FOR SENDING/RECEIVING PACKET BETWEEN NETWORK ELEMENTS IN NETWORK

(71) Applicant: Huawei Technologies Co., Ltd., Shenzhen (CN)

(72) Inventors: Chong Zhu, Xi'an (CN); Zhipeng Wu, Wuhan (CN); Feng Liu, Wuhan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 408 days.

(21) Appl. No.: 17/780,886

(22) PCT Filed: Nov. 12, 2020

(86) PCT No.: PCT/CN2020/128267
§ 371 (c)(1),
(2) Date: May 27, 2022

(87) PCT Pub. No.: WO2021/109821
PCT Pub. Date: Jun. 10, 2021

(65) Prior Publication Data
US 2023/0014379 A1     Jan. 19, 2023

(30) Foreign Application Priority Data
Dec. 3, 2019    (CN) .......................... 201911223143.8

(51) Int. Cl.
*H04L 67/5651*    (2022.01)
*H04L 69/04*    (2022.01)
*H04L 69/06*    (2022.01)

(52) U.S. Cl.
CPC .......... *H04L 67/5651* (2022.05); *H04L 69/04* (2013.01); *H04L 69/06* (2013.01)

(58) Field of Classification Search
CPC ...... H04L 67/5651; H04L 69/04; H04L 69/06
See application file for complete search history.

(56) References Cited

U.S. PATENT DOCUMENTS

| | | |
|---|---|---|
| 2006/0129689 A1 | 6/2006 | Ho et al. |
| 2008/0123723 A1 | 5/2008 | Aoyama et al. |
| (Continued) | | |

FOREIGN PATENT DOCUMENTS

| | | |
|---|---|---|
| CN | 101026566 A | 8/2007 |
| CN | 101072188 A | 11/2007 |
| (Continued) | | |

*Primary Examiner* — Schquita D Goodwin
(74) *Attorney, Agent, or Firm* — Conley Rose, P.C.

(57) ABSTRACT

A packet sending method includes, when a network element in a serial network receives a to-be-forwarded packet at a previous node from a previous network element, and when the network element needs to send a to-be-sent packet at a current node, determining whether the to-be-sent packet at the current node and the to-be-forwarded packet at the previous node can be superimposed, where the network element is an intermediate network element in the serial network; when the to-be-sent packet at the current node and the to-be-forwarded packet at the previous node can be superimposed, superimposing the to-be-sent packet at the current node and the to-be-forwarded packet at the previous node, to obtain a to-be-forwarded packet at the current node; and sending the to-be-forwarded packet at the current node to a next network element of the network element.

20 Claims, 6 Drawing Sheets

(56) References Cited

U.S. PATENT DOCUMENTS

| | | | |
|---|---|---|---|
| 2012/0155493 A1 | 6/2012 | Biehler | |
| 2013/0237259 A1* | 9/2013 | Umehara | H04W 4/023 |
| | | | 455/500 |
| 2016/0234329 A1* | 8/2016 | Gibson | H04L 67/5651 |
| 2016/0294692 A1 | 10/2016 | Balasubramanian | |
| 2017/0289316 A1* | 10/2017 | Solis | H04L 69/04 |
| 2019/0044889 A1 | 2/2019 | Serres et al. | |
| 2019/0191330 A1 | 6/2019 | Dao et al. | |
| 2020/0162589 A1* | 5/2020 | Vijayadharan | H04W 24/08 |
| 2020/0220953 A1 | 7/2020 | Wu et al. | |
| 2020/0259896 A1* | 8/2020 | Sachs | H04L 67/12 |
| 2021/0266385 A1* | 8/2021 | Lu | H04L 69/04 |
| 2022/0103456 A1* | 3/2022 | Cozza | H04W 40/22 |
| 2022/0256015 A1* | 8/2022 | Takahashi | H04L 69/04 |
| 2023/0014379 A1 | 1/2023 | Zhu et al. | |

FOREIGN PATENT DOCUMENTS

| | | |
|---|---|---|
| CN | 101252534 A | 8/2008 |
| CN | 101415276 A | 4/2009 |
| CN | 103139222 A | 6/2013 |
| CN | 103379046 A | 10/2013 |
| CN | 105577566 A | 5/2016 |
| CN | 106375233 A | 2/2017 |
| CN | 106817726 A | 6/2017 |
| CN | 108206746 A | 6/2018 |
| CN | 109120687 A | 1/2019 |
| CN | 109218200 A | 1/2019 |
| CN | 109831267 A | 5/2019 |
| CN | 111083208 A | 4/2020 |
| EP | 3468101 A1 | 4/2019 |
| JP | 2008135855 A | 6/2008 |
| JP | 2011172142 A | 9/2011 |
| WO | 2019100794 A1 | 5/2019 |

\* cited by examiner

FIG. 1

When a network element in a serial network receives a to-be-forwarded packet at a previous node that is sent by a previous network element, if the network element needs to send a to-be-sent packet at a current node, determine whether the to-be-sent packet at the current node and the to-be-forwarded packet at the previous node can be superimposed, where the network element is an intermediate network element in the serial network — 201

If the to-be-sent packet at the current node and the to-be-forwarded packet at the previous node can be superimposed, superimpose the to-be-sent packet at the current node and the to-be-forwarded packet at the previous node, to obtain a to-be-forwarded packet at the current node — 202

Send the to-be-forwarded packet at the current node to a next network element of the network element — 203

To-be-forwarded packet at a previous node

| Message type | Message length | Message data |
|---|---|---|
| Type value 11 | 16 bits | 0101110011101110 |

To-be-sent packet at a current node

| Message type | Message length | Message data |
|---|---|---|
| Type value 16 | 32 bits | 01011100111011001011110011101110 |

To-be-forwarded packet at the current node

| Message type | Message length | Message data | Message type | Message length | Message data |
|---|---|---|---|---|---|
| Type value 11 | 16 bits | 0101110011101110 | Type value 16 | 32 bits | 01011100111011001011110011101110 |

FIG. 4A

| | Message type | Message length | Message data |
|---|---|---|---|
| To-be-forwarded packet at a previous node | Type value 11 | 16 bits | 0101111001110110 |

| | Message type | Message length | Message data |
|---|---|---|---|
| To-be-sent packet at a current node | Type value 16 | 16 bits | 1000011001101110 |

| | Message type | Message data | Message type | Message data |
|---|---|---|---|---|
| To-be-forwarded packet at the current node | Type value 11 | 0101111001110110 | Type value 16 | 1000011001101110 |

FIG. 4B

To-be-forwarded packet at a previous node

| Message type | Message length | Message data |
|---|---|---|
| Type value 11 | 16 bits | 0101110011101110 |

To-be-sent packet at a current node

| Message type | Message length | Message data |
|---|---|---|
| Type value 11 | 32 bits | 01011100111011001011 11001110110 |

To-be-forwarded packet at the current node

| Message length | Message data | Message length | Message data |
|---|---|---|---|
| 16 bits | 0101110011101110 | 32 bits | 01011100111011001011 11001110110 |

FIG. 4C

|  | Message type | Message length | Message data |
|---|---|---|---|
| To-be-forwarded packet at a previous node | Type value 11 | 16 bits | 0101111001110110 |

|  | Message type | Message length | Message data |
|---|---|---|---|
| To-be-sent packet at a current node | Type value 11 | 16 bits | 0101001011100111 |

|  | Message data | Message data |
|---|---|---|
| To-be-forwarded packet at the current node | 0101111001110110 | 0101001011100111 |

FIG. 4D

When a last node network element in a serial network receives a to-be-forwarded packet at a previous node that is sent by a previous network element, determine a superimposition manner of the to-be-forwarded packet at the previous node, where the to-be-forwarded packet at the previous node is sent to the last node network element by using a method for sending a packet between network elements in a network — 501

Decapsulate the to-be-forwarded packet at the previous node in the superimposition manner, to obtain message data in each of to-be-forwarded packets sent by other network elements in the serial network, where the other network elements are network elements other than the last node network element in the serial network — 502

FIG. 5

NETWORK STRUCTURE AND METHOD FOR SENDING/RECEIVING PACKET BETWEEN NETWORK ELEMENTS IN NETWORK

CROSS-REFERENCE TO RELATED APPLICATIONS

This is a U.S. National Stage of International Patent Application No. PCT/CN2020/128267 filed on Nov. 12, 2020, which claims priority to Chinese Patent Application No. 201911223143.8 filed on Dec. 3, 2019. Both of the aforementioned applications are hereby incorporated by reference in their entireties.

TECHNICAL FIELD

This application relates to the field of network communications technologies, and in particular, to a network structure and a method for sending/receiving a packet between network elements in a network.

BACKGROUND

Figure 1:
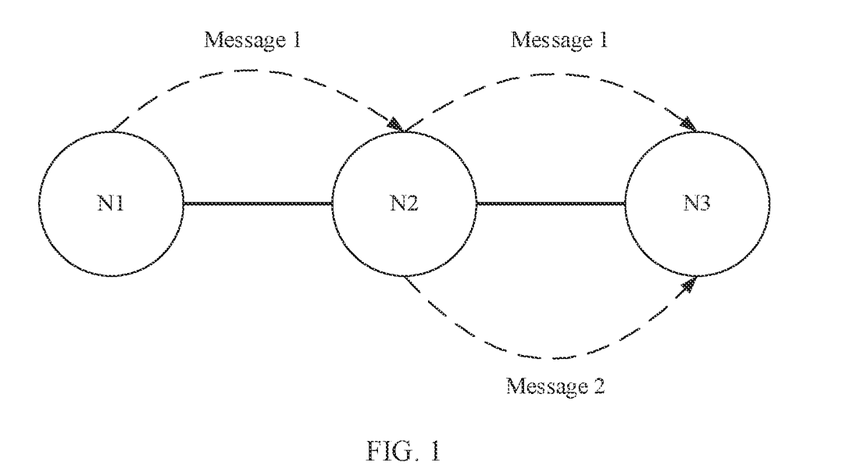
FIG. 1 is a schematic diagram of a network structure of a serial network in the conventional technology.

With rapid development of wireless broadband technologies, a plurality of devices may be jointly networked, and each node device in a network obtained after networking is referred to as a network element. Network elements may be directly or indirectly connected by using a physical technology such as a wireless manner, a power cable, or a network cable. FIG. 1 is a schematic diagram of a network structure of a serial network in the conventional technology.

Referring to FIG. 1, the serial network includes a network element N1, a network element N2, and a network element N3. A direct connection is established between the network element N1 and the network element N2, and a direct connection is established between the network element N2 and the network element N3. The two direct connections may be wireless connection manners (for example, radio frequency communication) or wired connection manners (for example, power cables or network cables). An indirect connection is established between the network element N1 and the network element N3 by using the network element N2. In the network element N1, the network element N2, and the network element N3, two directly connected network elements need to use a same protocol stack (for example, a TCP/IP protocol stack).

A case of receiving a message by the network element N3 is used as an example.

Case of receiving a message 1 sent by the network element 1: If the network element N1 needs to send the message 1 to the network element N3, the message is forwarded to the network element N3 by the network element N2. Regardless of whether a network between the network element N1 and the network element N3 is the serial network shown in FIG. 1 or another complex mesh network, the network element N3 needs to receive once the message 1 sent by the network element N1.

Case of receiving a message 2 sent by the network element 2: If needing to send the message 2 to the network element 3, the network element N2 directly sends the message 2 to the network element N3. Regardless of whether a network between the network element N2 and the network element N3 is the serial network shown in FIG. 1 or another complex mesh network, the network element N3 needs to receive once the message 2 sent by the network element N2.

If time tolerance for the message 1 and the message 2 to reach the network element 3 falls within a range acceptable to the network element 3, the network element 3 needs to perform message receiving two times. Consequently, a receiving module of the network element 3 needs to work two times. If a wireless connection (for example, a Wi-Fi connection) is established between the network element 3 and the network element 2, the network element 3 needs to receive two Wi-Fi radio frequency signals. If the network element 3 is a battery-powered terminal device (for example, a mobile phone), the network element 3 consumes double power for receiving. Particularly, when the mobile phone is in a specific power-saving state, there is a very obvious power loss because the mobile phone is woken up two times in receiving two messages. In addition to forwarding the message 1 to the network element 3, the network element 2 needs to send the message 2 to the network element 3. Consequently, the network element 2 performs message sending two times. However, a power loss caused by two times of message sending is unacceptable for some battery-powered devices.

SUMMARY

In view of this, embodiments of this application provide a network structure and a method for sending/receiving a packet between network elements in a network, to resolve a prior-art problem that there is relatively high power consumption in a process of sending/receiving a message between network elements in a serial network.

According to an aspect, an embodiment of this application provides a method for sending a packet between network elements in a network. The network includes a serial network, and the method includes: when a network element in the serial network receives a to-be-forwarded packet at a previous node that is sent by a previous network element, if the network element needs to send a to-be-sent packet at a current node, determining whether the to-be-sent packet at the current node and the to-be-forwarded packet at the previous node can be superimposed, where the network element is an intermediate network element in the serial network; if the to-be-sent packet at the current node and the to-be-forwarded packet at the previous node can be superimposed, superimposing the to-be-sent packet at the current node and the to-be-forwarded packet at the previous node, to obtain a to-be-forwarded packet at the current node; and sending the to-be-forwarded packet at the current node to a next network element of the network element.

In a possible design, the determining whether the to-be-sent packet at the current node and the to-be-forwarded packet at the previous node can be superimposed includes:
  determining whether a sending time obtained after the to-be-sent packet at the current node and the to-be-forwarded packet at the previous node are superimposed meets a receiving time tolerance range of the next network element of the network element; and
  if the receiving time tolerance range is met, determining that the to-be-sent packet at the current node and the to-be-forwarded packet at the previous node can be superimposed.

In a possible design, if the receiving time tolerance range is not met, the to-be-sent packet at the current node and the to-be-forwarded packet at the previous node are separately sent to the next network element of the network element.

In a possible design, the superimposing the to-be-sent packet at the current node and the to-be-forwarded packet at the previous node, to obtain a to-be-forwarded packet at the current node includes:
  determining a superimposition manner based on a message type and a message length of the to-be-sent packet at the current node and a message type and a message length of the to-be-forwarded packet at the previous node; and superimposing the to-be-sent packet at the current node and the to-be-forwarded packet at the previous node in the superimposition manner, to obtain the to-be-forwarded packet at the current node.

In a possible design, the determining a superimposition manner based on a message type and a message length of the to-be-sent packet at the current node and a message type and a message length of the to-be-forwarded packet at the previous node includes:
  if the message type of the to-be-sent packet at the current node is different from that of the to-be-forwarded packet at the previous node, and the message length of the to-be-sent packet at the current node is also different from that of the to-be-forwarded packet at the previous node, superimposing the to-be-sent packet at the current node and the to-be-forwarded packet at the previous node in a first superimposition manner, to obtain the to-be-forwarded packet at the current node.

In a possible design, the first superimposition manner is a superimposition manner of a message type+a message length+message data.

In a possible design, the determining a superimposition manner based on a message type and a message length of the to-be-sent packet at the current node and a message type and a message length of the to-be-forwarded packet at the previous node includes: if the message type of the to-be-sent packet at the current node is different from that of the to-be-forwarded packet at the previous node, but the message length of the to-be-sent packet at the current node is the same as that of the to-be-forwarded packet at the previous node, superimposing the to-be-sent packet at the current node and the to-be-forwarded packet at the previous node in a second superimposition manner, to obtain the to-be-forwarded packet at the current node.

In a possible design, the second superimposition manner is a superimposition manner of a message type+message data.

In a possible design, the determining a superimposition manner based on a message type and a message length of the to-be-sent packet at the current node and a message type and a message length of the to-be-forwarded packet at the previous node includes:
  if the message type of the to-be-sent packet at the current node is the same as that of the to-be-forwarded packet at the previous node, but the message length of the to-be-sent packet at the current node is different from that of the to-be-forwarded packet at the previous node, superimposing the to-be-sent packet at the current node and the to-be-forwarded packet at the previous node in a third superimposition manner, to obtain the to-be-forwarded packet at the current node.

In a possible design, the third superimposition manner is a superimposition manner of a message length+message data.

In a possible design, the determining a superimposition manner based on a message type and a message length of the to-be-sent packet at the current node and a message type and a message length of the to-be-forwarded packet at the previous node includes:
  if the message type of the to-be-sent packet at the current node is the same as that of the to-be-forwarded packet at the previous node, and the message length of the to-be-sent packet at the current node is also the same as that of the to-be-forwarded packet at the previous node, superimposing the to-be-sent packet at the current node and the to-be-forwarded packet at the previous node in a fourth superimposition manner, to obtain the to-be-forwarded packet at the current node.

In a possible design, the fourth superimposition manner is a superimposition manner of message data+message data.

In a possible design, the method further includes: when the network element in the serial network receives the to-be-forwarded packet at the previous node that is sent by the previous network element, if there is no to-be-sent packet at the current node that needs to be sent by the network element, superimposing a null data packet and the to-be-forwarded packet at the previous node, to obtain a to-be-forwarded packet at the current node; and sending the to-be-forwarded packet at the current node to the next network element of the network element.

According to another aspect, an embodiment of this application further provides a method for receiving a packet between network elements in a network. The network includes a serial network, and the method includes: when a last node network element in the serial network receives a to-be-forwarded packet at a previous node that is sent by a previous network element, determining a superimposition manner of the to-be-forwarded packet at the previous node, where the to-be-forwarded packet at the previous node is sent to the last node network element by using the foregoing method for sending a packet between network elements in a network; and decapsulating the to-be-forwarded packet at the previous node in a decapsulation manner that matches the superimposition manner, to obtain message data in each of to-be-forwarded packets sent by other network elements in the serial network, where the other network elements are network elements other than the last node network element in the serial network.

According to still another aspect, an embodiment of this application further provides a network structure, including a serial network. The serial network includes a first node network element, a plurality of intermediate network elements, and a last node network element that are sequentially connected. The intermediate network elements sequentially send to-be-forwarded packets at current nodes to the last node network element by using the foregoing method for sending a packet between network elements in a network. The last node network element decapsulates, by using the foregoing method for receiving a packet between network elements in a network, a received to-be-forwarded packet at the current node that is sent by a previous network element, to obtain message data in each of to-be-forwarded packets sent by other network elements in the serial network.

Compared with the conventional technology, the technical solutions have at least the following beneficial effects:

According to the method for sending a packet between network elements in a network provided in the embodiments of this application, in the serial network in the network structure, the intermediate network element (a network element other than a first node network element and a last node network element in the serial network) receives the to-be-forwarded packet at the previous node that is sent by the previous network element, and if needing to send the to-be-sent packet at the current node, the intermediate network element superimposes the to-be-sent packet at the current node and the to-be-forwarded packet at the previous node, to obtain the to-be-forwarded packet at the current node, and then sends the to-be-forwarded packet at the current node to the network element of the intermediate network element. In such a packet sending method, the intermediate network element in the serial network needs to receive only one to-be-forwarded packet (namely, the to-be-forwarded packet at the previous node that is sent by the previous network element), and sends one to-be-forwarded packet (namely, the to-be-forwarded packet at the current node). Therefore, power consumption of each intermediate network element in a packet sending/receiving process can be reduced.

Further, to superimpose the to-be-sent packet at the current node and the to-be-forwarded packet at the previous node, the superimposition manner is determined based on the message types of the to-be-sent packet at the current node and the to-be-forwarded packet at the previous node. When the message types and/or the message lengths of the to-be-sent packet at the current node and the to-be-forwarded packet at the previous node are the same, a superimposition manner in which space occupied by the to-be-forwarded packet at the current node that is obtained after superimposition can be reduced is used.

According to the method for receiving a packet between network elements in a network provided in the embodiments of this application, the last node network element (namely, a network element that finally receives a message) in the serial network needs to receive only one to-be-forwarded packet (namely, the to-be-forwarded packet at the previous node that is sent by the previous network element of the last node network element), and decapsulates the to-be-forwarded packet at the previous node based on the superimposition manner of the to-be-forwarded packet at the previous node, to obtain the message data in each of the to-be-forwarded packets sent by the network elements other than the last node network element in the serial network. In such a packet receiving method, the last node network element in the serial network needs to receive only one to-be-forwarded packet, and performs decapsulation once, to obtain the message data in the to-be-forwarded packets sent by the other network elements. Therefore, power consumption of the last node network element in a packet receiving and packet decapsulation process is reduced.

BRIEF DESCRIPTION OF DRAWINGS

To describe the technical solutions in the embodiments of this application more clearly, the following briefly describes the accompanying drawings for the embodiments. It is clear that, the accompanying drawings in the following description show merely some embodiments of this application, and a person of ordinary skill in the art may derive other drawings from these accompanying drawings without creative efforts.

DESCRIPTION OF EMBODIMENTS

To better understand the technical solutions of this application, the following describes the embodiments of this application in detail with reference to the accompanying drawings.

It should be clear that the described embodiments are merely some rather than all of the embodiments of this application. All other embodiments obtained by a person of ordinary skill in the art based on the embodiments of this application without creative efforts shall fall within the protection scope of this application.

Network structures to which the technical solutions of this application are applicable include a star topology network, a bus topology network, a ring topology network, and a tree topology network. The star topology network includes a central node and stations connected to the central node through a point-to-point link. In the bus topology network, a single transmission line is used as a transmission medium, and all stations are directly connected to the transmission medium (namely, a bus) through corresponding hardware interfaces. In the ring topology network, point-to-point links form a closed ring. The tree topology network is evolved from the bus topology network, includes at least one root with branches, and may be further extended to several sub-branches.

After a plurality of devices are networked based on the foregoing network structure, a device at each node in a network is referred to as a network element. With development of wireless communications technologies, devices may be connected in a wired communication manner or a wireless communication manner in various network structures.

In any one of the foregoing network structures, some networks are usually serial networks (for example, the network structure shown in FIG. 1). The technical solutions of this application are mainly applicable to a manner of sending/receiving a packet between network elements in a serial network in various network structures.

Figure 2:
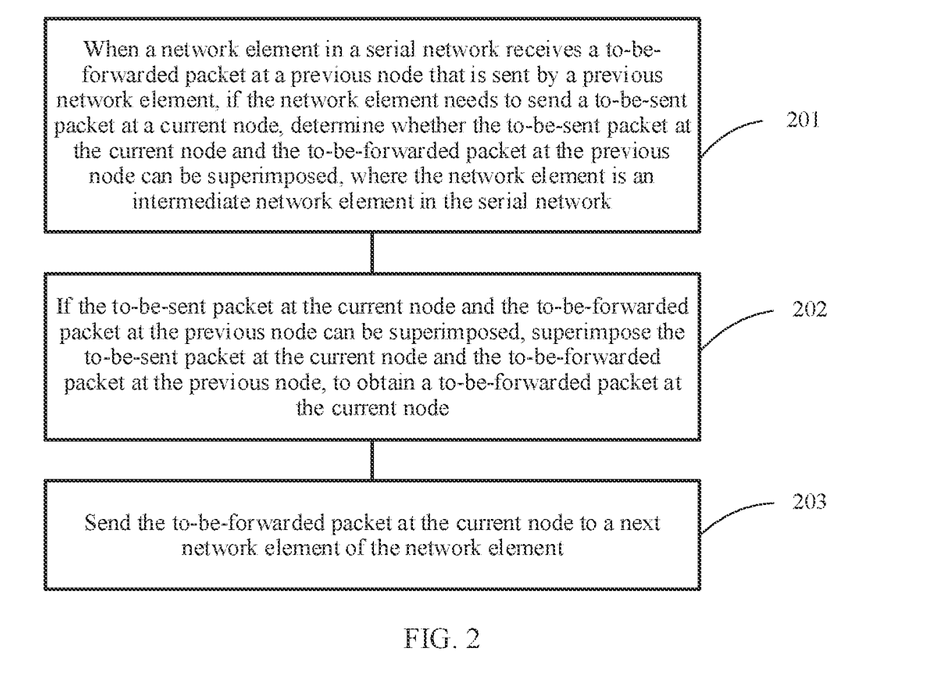
FIG. 2 is a schematic flowchart of a specific embodiment of a method for sending a packet between network elements in a network according to an embodiment of this application.

FIG. 2 is a schematic flowchart of a specific embodiment of a method for sending a packet between network elements in a network according to an embodiment of this application. Referring to FIG. 2, the method includes the following steps.

Step 201: When a network element in a serial network receives a to-be-forwarded packet at a previous node that is sent by a previous network element, if the network element needs to send a to-be-sent packet at a current node, determine whether the to-be-sent packet at the current node and the to-be-forwarded packet at the previous node can be superimposed, where the network element is an intermediate network element in the serial network.

Step 202: If the to-be-sent packet at the current node and the to-be-forwarded packet at the previous node can be superimposed, superimpose the to-be-sent packet at the current node and the to-be-forwarded packet at the previous node, to obtain a to-be-forwarded packet at the current node.

Step 203. Send the to-be-forwarded packet at the current node to a next network element of the network element.

As described above, the method for sending a packet between network elements in a network in this embodiment is applicable to the serial network in a network structure. For ease of understanding this embodiment, the serial network to which this embodiment is applicable is first briefly described.

Figure 3:
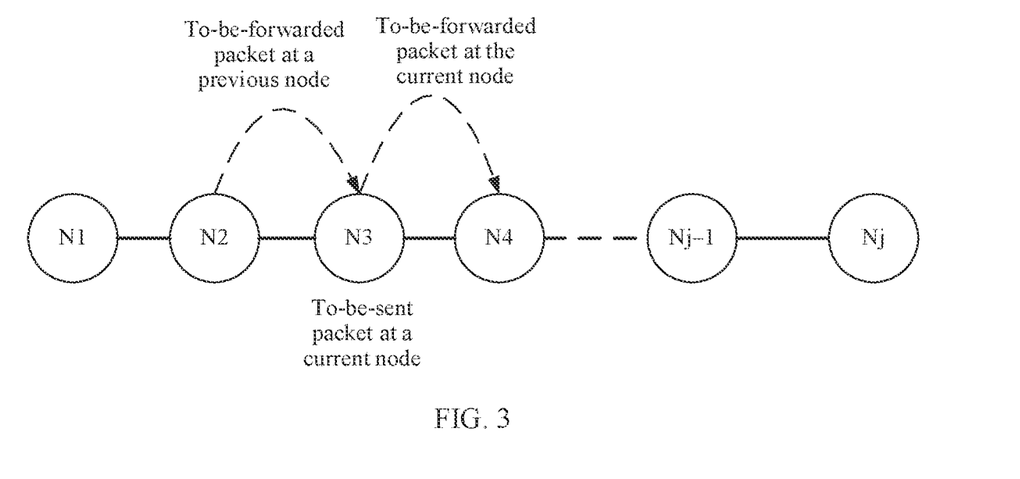
FIG. 3 is a schematic diagram of a network structure of a serial network to which a method for sending a packet between network elements in a network shown in FIG. 2 is applicable.

FIG. 3 is a schematic diagram of a network structure of a serial network to which the method for sending a packet between network elements in a network shown in FIG. 2 is applicable. Referring to FIG. 3, the serial network includes j network elements that are sequentially connected: a network element N1, a network element N2, a network element N3, a network element N4, . . . , a network element Nj–1, and a network element Nj. A specific value of j may be determined based on a quantity of nodes in the serial network in actual application. In the serial network shown in FIG. 3, the network element N1 is a first node network element, the network element N2, the network element N3, . . . , and the network element Nj–1 are intermediate network elements, and the network element Nj is a last node network element. In the serial network, if the network element N2 needs to send a packet to the network element Nj, the packet sent by the network element N2 needs to sequentially reach the network element N3, the network element N4, . . . , and the network element Nj–1 before reaching the network element Nj.

In this embodiment, the steps are performed by the intermediate network element in the serial network. The packet sending method in this embodiment is described by using an example in which the network element N3 in FIG. 3 is used as the intermediate network element.

As described in step 201, when the network element in the serial network receives the to-be-forwarded packet at the previous node that is sent by the previous network element, if the network element needs to send the to-be-sent packet at the current node, it is determined whether the to-be-sent packet at the current node and the to-be-forwarded packet at the previous node can be superimposed.

With reference to FIG. 2 and FIG. 3, when the network element N3 receives a to-be-forwarded packet at a previous node that is sent by the network element N2 (namely, a previous network element of the network element N3), if the network element N3 needs to send a to-be-sent packet at a current node, it is determined whether the to-be-sent packet at the current node and the to-be-forwarded packet at the previous node can be superimposed.

Specifically, this step includes:

Step 2011: Determine whether a sending time obtained after the to-be-sent packet at the current node and the to-be-forwarded packet at the previous node are superimposed meets a receiving time tolerance range of the next network element of the network element.

Step 2012: If the receiving time tolerance range is met, determine that the to-be-sent packet at the current node and the to-be-forwarded packet at the previous node can be superimposed.

It is understood by a person skilled in the art that to ensure communication efficiency between network elements in a network, in a packet transfer process, a maximum time range (namely, the receiving time tolerance range) for receiving a packet needs to be set for each network element. Further referring to FIG. 3, for example, a receiving time tolerance range of the network element 4 is set to be less than or equal to 20 ms (in other words, a maximum receiving time tolerance range does not exceed 20 ms). The network element 3 needs to determine whether a sending time obtained after the to-be-sent packet at the current node and the to-be-forwarded packet at the previous node are superimposed is less than or equal to 20 ms, in other words, whether the receiving time tolerance range of the network element 4 (namely, a next network element of the network element 3) is met.

As described in step 202, if the to-be-sent packet at the current node and the to-be-forwarded packet at the previous node can be superimposed, the to-be-sent packet at the current node and the to-be-forwarded packet at the previous node are superimposed, to obtain the to-be-forwarded packet at the current node.

Specifically, if the receiving time tolerance range is met, it is determined that the to-be-sent packet at the current node and the to-be-forwarded packet at the previous node can be superimposed. The to-be-sent packet at the current node and the to-be-forwarded packet at the previous node are superimposed, to obtain the to-be-forwarded packet at the current node.

In this embodiment, this step includes:

Step 2021: Determine a superimposition manner based on a message type and a message length of the to-be-sent packet at the current node and a message type and a message length of the to-be-forwarded packet at the previous node.

Step 2022: Superimpose the to-be-sent packet at the current node and the to-be-forwarded packet at the previous node in the superimposition manner, to obtain the to-be-forwarded packet at the current node.

It is understood by a person skilled in the art that a packet is a data unit exchanged and transmitted in a network, and the packet includes a message (or data) to be sent. A message type and a message length of a packet varies with a service type. In this embodiment, a specific superimposition manner is determined based on the message type and the message length of the to-be-sent packet at the current node and the message type and the message length of the to-be-forwarded packet at the previous node.

Superimposition manners are described below in detail with reference to specific embodiments.

First Superimposition Manner

Figure 4A:
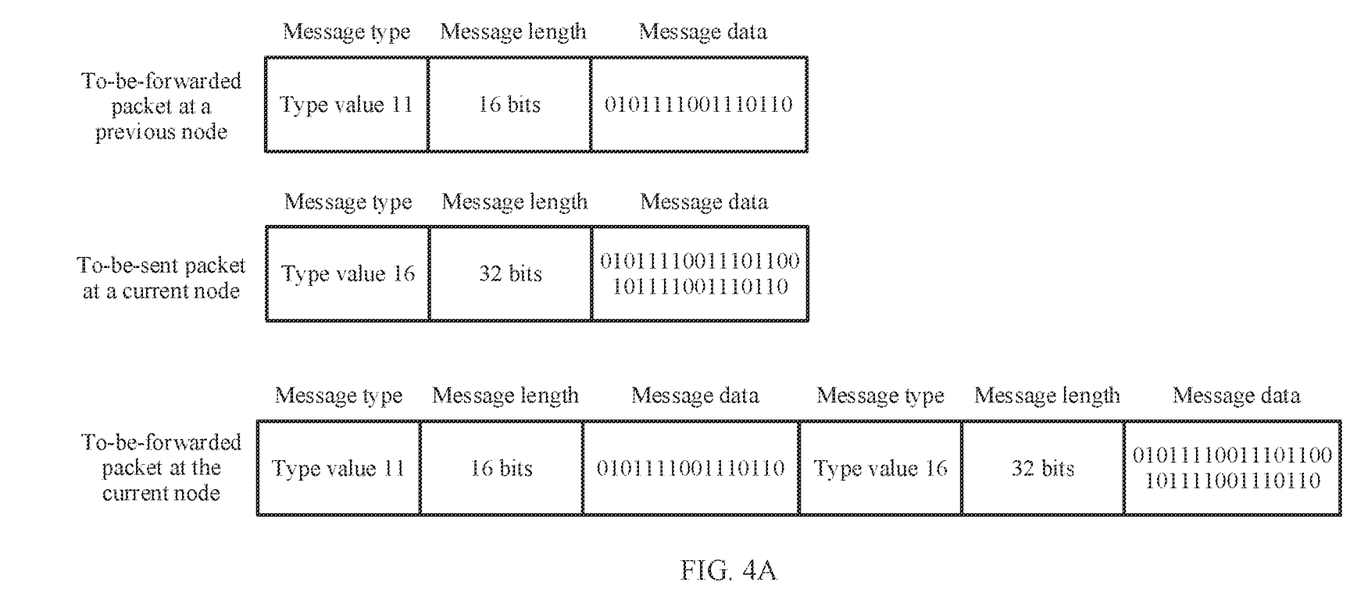
FIG. 4A is a schematic packet diagram of a packet superimposition manner in a method for sending a packet between network elements in a network according to an embodiment of this application.

FIG. 4A is a schematic packet diagram of a packet superimposition manner m a method for sending a packet between network elements in a network according to an embodiment of this application.

Referring to FIG. 4A, for the to-be-forwarded packet at the previous node, the message type is a type value 11, the message length is 16 bits, and message data is 0101111001110110; and for the to-be-sent packet at the current node, the message type is a type value 16, the message length is 32 bits, and message data is 01011110011101100101111001110110.

It may be learned that the message type of the to-be-sent packet at the current node is different from that of the to-be-forwarded packet at the previous node, and the message length of the to-be-sent packet at the current node is also different from that of the to-be-forwarded packet at the previous node. Therefore, the to-be-sent packet at the current node and the to-be-forwarded packet at the previous node are superimposed in the first superimposition manner, to obtain the to-be-forwarded packet at the current node.

Specifically, the first superimposition manner is a superimposition manner of a message type (Type, T for short)+a message length (Length. L for short)+message data (Value, V for short). That is, in a superimposition process, the respective message types, message lengths, and message data in the to-be-sent packet at the current node and the to-be-forwarded packet at the previous node are retained, and the to-be-sent packet at the current node and the to-be-forwarded packet at the previous node are superimposed in the superimposition manner of T+L+V, to obtain the to-be-forwarded packet at the current node. A packet structure of the to-be-forwarded packet at the current node is shown in FIG. 4A.

Second Superimposition Manner

Figure 4B:
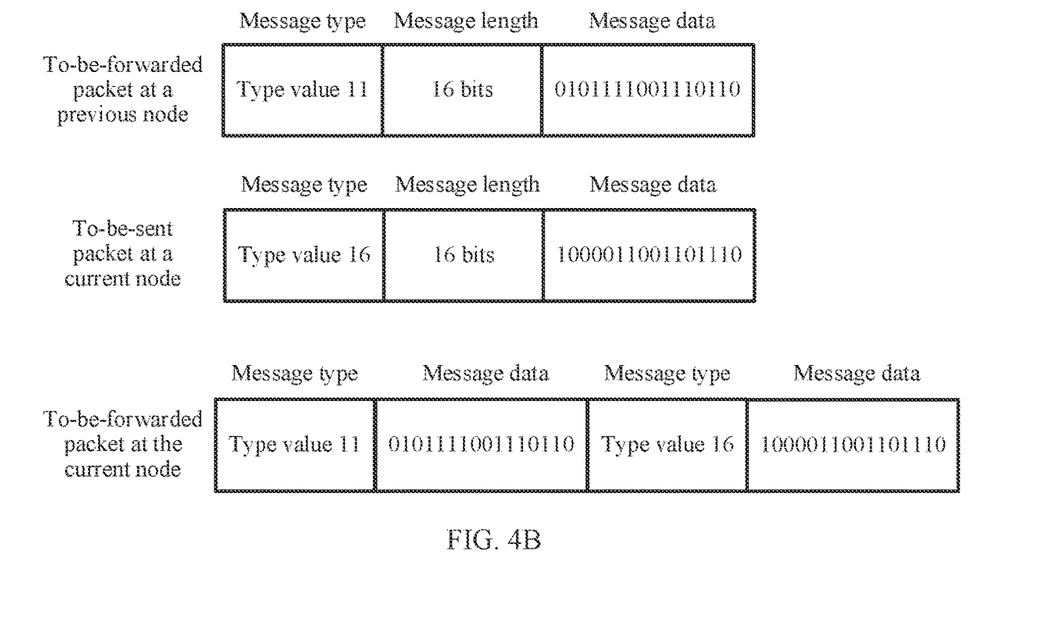
FIG. 4B is a schematic packet diagram of another packet superimposition manner in a method for sending a packet between network elements in a network according to an embodiment of this application.

FIG. 4B is a schematic packet diagram of another packet superimposition manner in a method for sending a packet between network elements in a network according to an embodiment of this application.

Referring to FIG. 4B, for the to-be-forwarded packet at the previous node, the message type is a type value 11, the message length is 16 bits, and message data is 0101111001110110; and for the to-be-sent packet at the current node, the message type is a type value 16, the message length is 16 bits, and message data is 1000011001101110.

It may be learned that the message type of the to-be-sent packet at the current node is different from that of the to-be-forwarded packet at the previous node, but the message length of the to-be-sent packet at the current node is the same as that of the to-be-forwarded packet at the previous node. Therefore, the to-be-sent packet at the current node and the to-be-forwarded packet at the previous node are superimposed in the second superimposition manner, to obtain the to-be-forwarded packet at the current node.

Specifically, the second superimposition manner is a superimposition manner of a message type (T)+message data (V). That is, in a superimposition process, the message lengths are the same (that is, the message length is a default value), and therefore the message length may be omitted in the to-be-forwarded packet at the current node that is obtained after superimposition, only the respective message types and message data in the to-be-sent packet at the current node and the to-be-forwarded packet at the previous node are retained, and the to-be-sent packet at the current node and the to-be-forwarded packet at the previous node are superimposed in the superimposition manner of T+V, to obtain the to-be-forwarded packet at the current node. A packet structure of the to-be-forwarded packet at the current node is shown in FIG. 4B.

Third Superimposition Manner

Figure 4C:
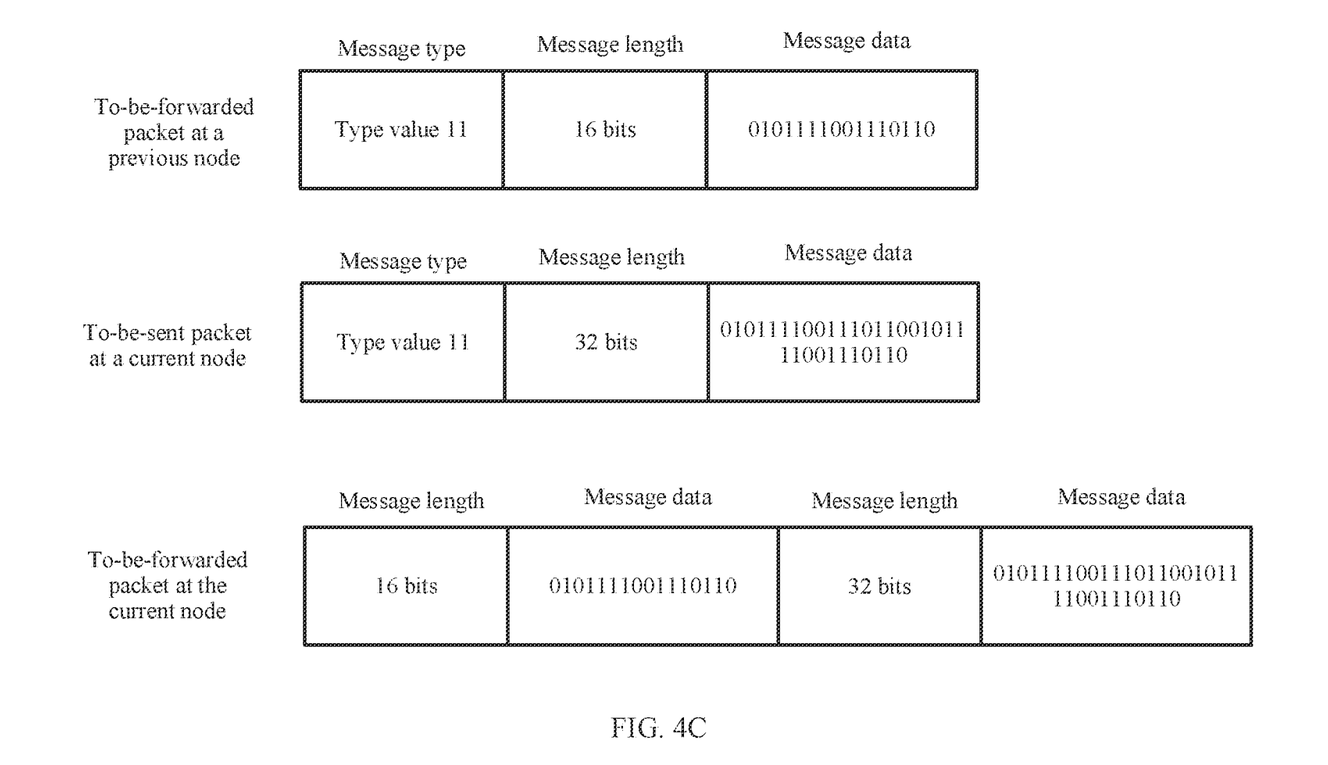
FIG. 4C is a schematic packet diagram of still another packet superimposition manner in a method for sending a packet between network elements in a network according to an embodiment of this application.

FIG. 4C is a schematic packet diagram of still another packet superimposition manner in a method for sending a packet between network elements in a network according to an embodiment of this application.

Referring to FIG. 4C, for the to-be-forwarded packet at the previous node, the message type is a type value 11, the message length is 16 bits, and message data is 0101111001110110; and for the to-be-sent packet at the current node, the message type is a type value 11, the message length is 32 bits, and message data is 01011110011101100101111001110110.

It may be learned that the message type of the to-be-sent packet at the current node is the same as that of the to-be-forwarded packet at the previous node, but the message length of the to-be-sent packet at the current node is different from that of the to-be-forwarded packet at the previous node. Therefore, the to-be-sent packet at the current node and the to-be-forwarded packet at the previous node are superimposed in the third superimposition manner, to obtain the to-be-forwarded packet at the current node.

Specifically, the third superimposition manner is a superimposition manner of a message length (L)+message data (V). That is, in a superimposition process, the message types are the same (that is, the message type is a default type value), and therefore the message type may be omitted in the to-be-forwarded packet at the current node that is obtained after superimposition, only the respective message lengths and message data in the to-be-sent packet at the current node and the to-be-forwarded packet at the previous node are retained, and the to-be-sent packet at the current node and the to-be-forwarded packet at the previous node are superimposed in the superimposition manner of L+V, to obtain the to-be-forwarded packet at the current node. A packet structure of the to-be-forwarded packet at the current node is shown in FIG. 4C.

Fourth Superimposition Manner

Figure 4D:
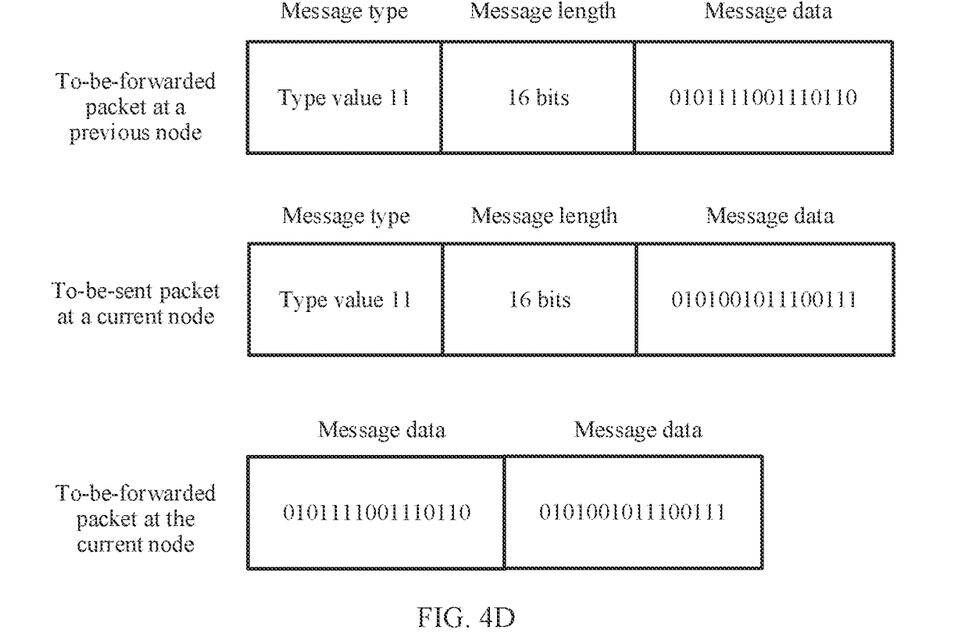
FIG. 4D is a schematic packet diagram of yet another packet superimposition manner in a method for sending a packet between network elements in a network according to an embodiment of this application.

FIG. 4D is a schematic packet diagram of yet another packet superimposition manner in a method for sending a packet between network elements in a network according to an embodiment of this application.

Referring to FIG. 4, for the to-be-forwarded packet at the previous node, the message type is a type value 11, the message length is 16 bits, and message data is 0101111001110110; and for the to-be-sent packet at the current node, the message type is a type value 11, the message length is 16 bits, and message data is 0101001011100111.

It may be learned that the message type of the to-be-sent packet at the current node is the same as that of the to-be-forwarded packet at the previous node, and the message length of the to-be-sent packet at the current node is also the same as that of the to-be-forwarded packet at the previous node. Therefore, the to-be-sent packet at the current node and the to-be-forwarded packet at the previous node are superimposed in the fourth superimposition manner, to obtain the to-be-forwarded packet at the current node.

Specifically, the fourth superimposition manner is a superimposition manner of message data (V)+message data (V). That is, in a superimposition process, the message types are the same (that is, the message type is a default type value) and the message lengths are the same (that is, the message type is a default value), and therefore the message type and the message length may be omitted in the to-be-forwarded packet at the current node that is obtained after superimposition, only the respective message data in the to-be-sent packet at the current node and the to-be-forwarded packet at the previous node is retained, and the to-be-sent packet at the current node and the to-be-forwarded packet at the previous node are superimposed in the superimposition manner of V+V, to obtain the to-be-forwarded packet at the current node. A packet structure of the to-be-forwarded packet at the current node is shown in FIG. 4D.

In the four superimposition manners, in the three superimposition manners other than the first superimposition manner, the message types and/or the message lengths of the to-be-forwarded packet at the previous node and the to-be-sent packet at the current node are the same, and therefore either or both of the message type and the message length are omitted in the to-be-forwarded packet at the current node that is obtained after superimposition. Therefore, space occupied by the to-be-forwarded packet at the current node is reduced.

On the contrary, if a determining result in step 2011 is no, that is, the sending time obtained after the to-be-sent packet at the current node and the to-be-forwarded packet at the previous node are superimposed fails to meet the receiving time tolerance range, it is determined that the to-be-sent packet at the current node and the to-be-forwarded packet at the previous node cannot be superimposed. In this case, the to-be-sent packet at the current node and the to-be-forwarded packet at the previous node are separately sent to the next network element of the network element.

Further, in this embodiment, the method further includes the following steps:

when the network element in the serial network receives the to-be-forwarded packet at the previous node that is sent by the previous network element, if there is no to-be-sent packet at the current node that needs to be sent by the network element, superimposing a null data packet and the to-be-forwarded packet at the previous node, to obtain a to-be-forwarded packet at the current node; and sending the to-be-forwarded packet at the current node to the next network element of the network element.

Specifically, if there is no to-be-sent packet at the current node that needs to be sent by the network element, when receiving the to-be-forwarded packet at the previous node that is sent by the previous network element, the network element superimposes the null data packet and the to-be-forwarded packet at the previous node, to obtain the to-be-forwarded packet at the current node, so as to facilitate correct decapsulation for a last node network element. The null data packet is a packet whose message data is null.

In the superimposition process, the null data packet and the to-be-forwarded packet at the previous node differ in both message type and message length, and therefore the null data packet and the to-be-forwarded packet at the previous node may be superimposed in the first superimposition manner, to obtain the to-be-forwarded packet at the current node.

It should be noted that only one message type and one message length are usually used for packets in a serial network. Therefore, in this embodiment, after the intermediate network element determines the superimposition manner of the to-be-forwarded packet at the previous node and the to-be-sent packet at the current node, each intermediate network element in the entire serial network superimposes the to-be-forwarded packet at the previous node and the to-be-sent packet at the current node in this superimposition manner.

It may be learned that in the method for sending a packet between network elements in a network provided in this embodiment, the intermediate network element in the serial network needs to receive only one to-be-forwarded packet (namely, the to-be-forwarded packet at the previous node that is sent by the previous network element), and sends one to-be-forwarded packet (namely, the to-be-forwarded packet at the current node). Therefore, power consumption of each intermediate network element in a packet sending/receiving process can be reduced.

Figure 5:
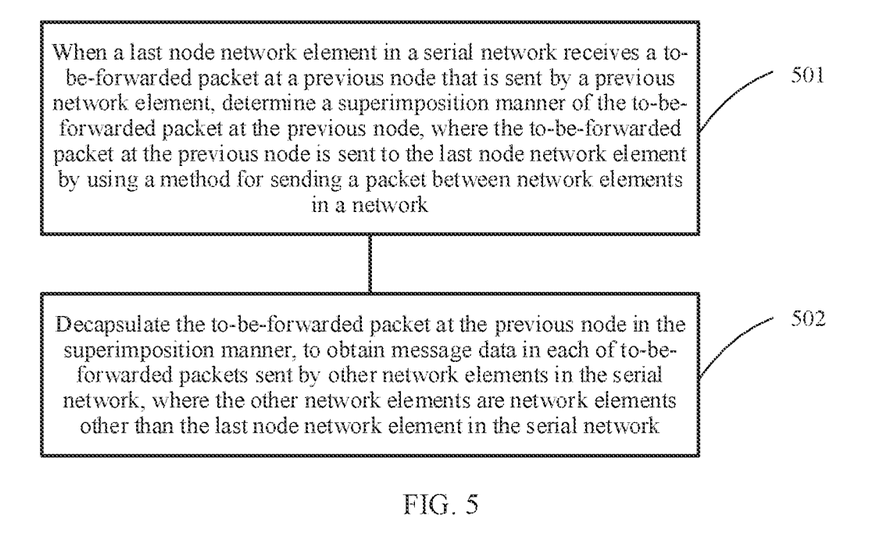
FIG. 5 is a schematic flowchart of a specific embodiment of a method for receiving a packet between network elements in a network according to an embodiment of this application.

FIG. 5 is a schematic flowchart of a specific embodiment of a method for receiving a packet between network elements in a network according to an embodiment of this application.

Referring to FIG. 5, the packet receiving method includes the following steps.

Step 501: When a last node network element in a serial network receives a to-be-forwarded packet at a previous node that is sent by a previous network element, determine a superimposition manner of the to-be-forwarded packet at the previous node, where the to-be-forwarded packet at the previous node is sent to the last node network element based on the foregoing method for sending a packet between network elements in a network.

Step 502: Decapsulate the to-be-forwarded packet at the previous node in a decapsulation manner that matches the superimposition manner, to obtain message data in each of to-be-forwarded packets sent by other network elements in the serial network, where the other network elements are network elements other than the last node network element in the serial network.

It should be noted that in this embodiment, each step of the packet receiving method is performed by the last node network element in the serial network. Further referring to the schematic diagram of the network structure of the serial network shown in FIG. 3, the network element Nj is a last node network element in the serial network. When receiving a to-be-forwarded packet at a previous node that is sent by a previous network element (namely, the network element Nj−1), the network element Nj determines a superimposition manner of the to-be-forwarded packet at the previous node. As described above, only one packet superimposition manner is usually used in a serial network. Therefore, superimposition manners used by packets previously sent by the network element N2 to a network element Nj−2 may be determined based on the superimposition manner used by the to-be-forwarded packet at the previous node that is sent by the network element Nj−1.

Further, after determining the superimposition manner, the last node network element decapsulates the to-be-forwarded packet at the previous node in the decapsulation manner that matches the superimposition manner, to obtain the message data in each of the to-be-forwarded packets sent by the other network elements in the serial network.

Specifically, further referring to FIG. 3, the network element Nj receives the to-be-forwarded packet at the previous node that is sent by the network element Nj−1, and decapsulates the to-be-forwarded packet at the previous node in a decapsulation manner that matches the determined superimposition manner. It may be learned from the embodiment of the method for sending a packet between network elements in a network that the to-be-forwarded packet at the previous node that is sent by the network element Nj−1 includes all to-be-forwarded packets that need to be sent to the network element Nj by the network element N1 to the network element Nj−1. These packets are superimposed in the superimposition manner in the embodiment of the packet sending method, to obtain the to-be-forwarded packet at the previous node that is sent by the network element Nj−1.

Therefore, after decapsulating the received to-be-forwarded packet at the previous node that is sent by the network element Nj−1, the network element Nj, serving as the last node network element in the serial network, may obtain message data in each of the to-be-forwarded packets that need to be sent by the network element N1 to the network element Nj−1.

It may be learned that in the packet receiving method provided in this embodiment, the last node network element in the serial network needs to receive only one to-be-forwarded packet, and performs decapsulation once, to obtain the message data in the to-be-forwarded packets sent by the other network elements in the serial network. Therefore, power consumption of the last node network element in a packet receiving and packet decapsulation process is reduced.

An embodiment of this application further provides a network structure. The network structure may be a star topology network, a bus topology network, a ring topology network, and a tree topology network. The network structure includes a serial network. The serial network includes a first node network element, a plurality of intermediate network elements, and a last node network element that are sequentially connected. The intermediate network elements sequentially send to-be-forwarded packets at current nodes to the last node network element based on the foregoing method for sending a packet between network elements in a network. The last node network element decapsulates, based on the foregoing method for receiving a packet between network elements in a network, a received to-be-forwarded packet at the current node that is sent by a previous network element, to obtain message data in each of to-be-forwarded packets sent by other network elements in the serial network.

The terms used in the embodiments of this application are merely for the purpose of illustrating specific embodiments, and are not intended to limit this application. The terms "a" and "the" of singular forms used in the embodiments and the appended claims of this application are also intended to include plural forms, unless otherwise specified in the context clearly.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The foregoing descriptions are merely example embodiments of this application, but are not intended to limit this application. Any modification, equivalent replacement, or improvement made without departing from the spirit and principle of this application should fall within the protection scope of this application.

What is claimed is:

1. A method implemented by an intermediate network element in a serial network and comprising:
   receiving a first to-be-forwarded packet;
   when a to-be-sent packet at the intermediate network element and the first to-be-forwarded packet at a previous network element can be superimposed and when the network element needs to send the to-be-sent packet;
   superimposing, in a selected superimposition manner based on a first message type of the to-be-sent packet, a first message length of the to-be-sent packet, a second message type of the first to-be-forwarded packet, and a second message length of the first to-be-forwarded packet, the to-be-sent packet and the first to-be-forwarded packet to obtain a second to-be-forwarded packet at the intermediate network element when the first message type is different from the second message type and the first message length is different from the second message length, and when a sending time obtained after the to-be-sent packet and the first to-be-forwarded packet are superimposed meets a receiving time tolerance range of the next network element; and
   sending the second to-be-forwarded packet to a next network element.

2. The method of claim 1, further comprising separately sending the to-be-sent packet and the first to-be-forwarded packet to the next network element when the receiving time tolerance range is not met.

3. The method of claim 1, wherein the selected superimposition manner is a message type plus a message length plus message data.

4. The method of claim 1, further comprising further superimposing, in a first superimposition manner, the to-be-sent packet and the first to-be-forwarded packet to obtain the second to-be-forwarded packet when the first message type is different from the second message type and the first message length is the same as the second message length.

5. The method of claim 4, wherein the first superimposition manner is a message type plus message data.

6. The method of claim 1, further comprising further superimposing, in a second superimposition manner, the to-be-sent packet and the first to-be-forwarded packet to obtain the second to-be-forwarded packet when the first message type is the same as the second message type and the first message length is different from the second message length.

7. The method of claim 6, wherein the second third superimposition manner is a message length plus message data.

8. The method of claim 1, further comprising further superimposing, in a third superimposition manner, the to-be-sent packet and the first to-be-forwarded packet to obtain the second to-be-forwarded packet when the first message type is the same as the second message type and the first message length is the same as the second message length.

9. The method of claim 8, wherein the third superimposition manner is message data plus message data.

10. The method of claim 1, further comprising superimposing a null data packet and the first to-be-forwarded packet to obtain the second to-be-forwarded packet when the intermediate network element receives the first to-be-forwarded packet and when the intermediate network element does not comprise a to-be-sent packet.

11. A serial network comprising:
    a first node network element configured to send a first to-be-forwarded packet;
    an intermediate network element coupled to the first node network element and configured to:
      receive, from the first node network element, the first to-be-forwarded packet;
      when a to-be-sent packet at the intermediate network element and the first to-be-forwarded packet can be superimposed and when the intermediate network element needs to send the to-be-sent packet;
      superimpose, in a selected superimposition manner based on a first message type of the to-be-sent packet, a first message length of the to-be-sent packet, a second message type of the first to-be-forwarded packet, and a second message length of the first to-be-forwarded packet, the to-be-sent packet and the first to-be-forwarded packet to obtain a second to-be-forwarded packet at the intermediate network element when the first message type is different from the second message type and the first message length is different from the second message length, and when a sending time obtained after the to-be-sent packet and the first to-be-forwarded packet are superimposed meets a receiving time tolerance range of the next network element; and
      send the second to-be-forwarded packet; and
    a last node network element coupled to the intermediate network element and configured to:
      receive, from the intermediate network element, the second to-be-forwarded packet; and
      decapsulate, in response to receiving the second to-be-forwarded packet, and in a decapsulation manner that matches the selected superimposition manner, the second to-be-forwarded packet to obtain first message data in the first to-be-forwarded packet and second message data in the to-be-sent packet.

12. The serial network of claim 11, wherein the intermediate network element is further configured to:
   determine whether a sending time obtained after the to-be-sent packet and the first to-be-forwarded packet are superimposed meets a receiving time tolerance range of the last node network element; and
   determine that the to-be-sent packet and the first to-be-forwarded packet can be superimposed when the receiving time tolerance range is met.

13. The serial network of claim 12, wherein the intermediate network element is further configured to separately send the to-be-sent packet and the first to-be-forwarded packet to the last node network element when the receiving time tolerance range is not met.

14. The serial network of claim 13, wherein the intermediate network element is further configured to further superimpose, based on a first message type of the to-be-sent packet and a first message length of the to-be-sent packet and a second message type of the first to-be-forwarded packet and a second message length of the first to-be-forwarded packet, the to-be-sent packet and the first to-be-forwarded packet to obtain the second to-be-forwarded packet.

15. The serial network of claim 11, wherein the intermediate network element is further configured to superimpose a null data packet and the first to-be-forwarded packet to obtain the second to-be-forwarded packet when the intermediate network element receives the first to-be-forwarded packet and when the intermediate network element does not comprise a to-be-sent packet.

16. The serial network of claim 11, wherein the selected superimposition manner is a message type plus a message length plus message data.

17. The serial network of claim 11, wherein the selected superimposition manner is a message type plus message data.

18. The serial network of claim 11, wherein the selected superimposition manner is a message length plus message data.

19. The serial network of claim 11, wherein the selected superimposition manner is message data plus message data.

20. The serial network of claim 11, wherein the intermediate network element is further configured to further superimpose the to-be-sent packet and the first to-be-forwarded packet to obtain the second to-be-forwarded packet when the first message type is different from the second message type and the first message length is the same as the second message length.

* * * * *

UNITED STATES PATENT AND TRADEMARK OFFICE
CERTIFICATE OF CORRECTION

| | | |
|---|---|---|
| PATENT NO. | : 12,425,490 B2 | Page 1 of 1 |
| APPLICATION NO. | : 17/780886 | |
| DATED | : September 23, 2025 | |
| INVENTOR(S) | : Chong Zhu, Zhipeng Wu and Feng Liu | |

It is certified that error appears in the above-identified patent and that said Letters Patent is hereby corrected as shown below:

In the Claims

Claim 7, Column 14, Lines 16-17: "the second third superimposition" should read "the second superimposition"

Signed and Sealed this
Twenty-eighth Day of October, 2025

John A. Squires
*Director of the United States Patent and Trademark Office*